(No Model.) 2 Sheets—Sheet 1.
H. C. BEEBE.
GRAIN DRILL.
No. 321,273. Patented June 30, 1885.
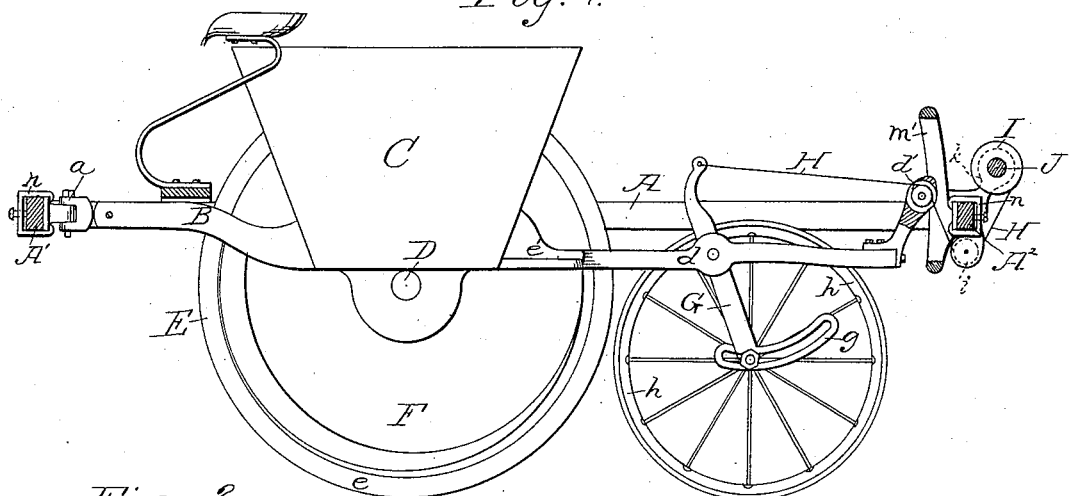
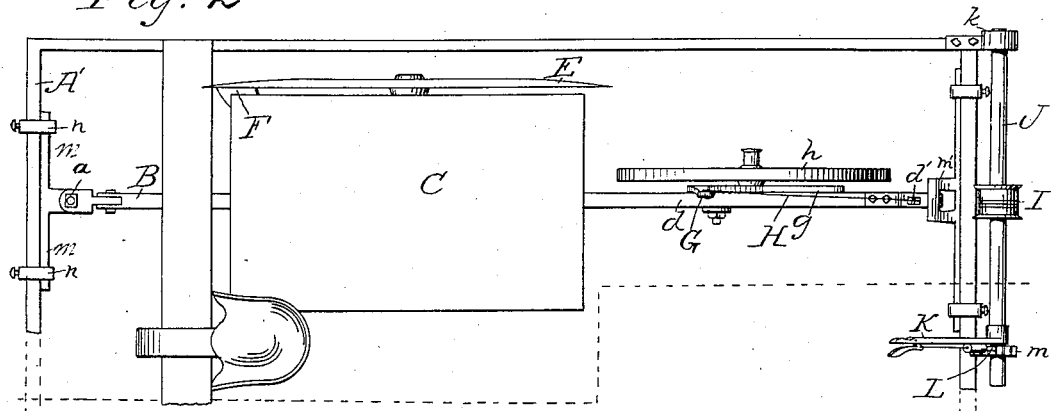
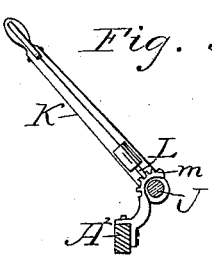
WITNESSES:
H. Hackendorff
Frank D. Thompson
INVENTOR
Henry C. Beebe
BY James H. Coyne,
ATTORNEY (No Model.)  2 Sheets—Sheet 2.

H. C. BEEBE.
GRAIN DRILL.

No. 321,273.  Patented June 30, 1885.

WITNESSES:
H. Wackendorff
Frank D. Thomason

Henry C. Beebe.
INVENTOR

BY James H. Coyne
ATTORNEY

UNITED STATES PATENT OFFICE.

HENRY C. BEEBE, OF CANTON, ILLINOIS.

GRAIN-DRILL.

SPECIFICATION forming part of Letters Patent No. 321,273, dated June 30, 1885.

Application filed September 6, 1884. (No model.)

*To all whom it may concern:*

Be it known that I, HENRY C. BEEBE, of Canton, in the county of Fulton and State of Illinois, have invented certain new and useful Improvements in Grain-Drills; and I do hereby declare that the following is a full, clear, and exact description of the invention, which will enable others skilled in the art to which it appertains to make and use the same, reference being had to the accompanying drawings, and to letters of reference marked thereon, which form a part of this specification The object of my invention is to provide a grain-drill or corn-planter frame within which may be adjusted one or more drills or planters, as desired; and, moreover, its object is to provide improved means for making the furrow into which the seed is deposited, and means for regulating the depth of the same.

My invention consists of a rectangular frame, which is provided with a series of laterally-adjustable beams secured to the end bars thereof, which are connected to and support the drills or planters; of the devices which, in conjunction with the beams in the rear of the drills or planters, regulate the depth of the furrows, and of the combined rotary colter and shield making said furrows.

Figure 3:
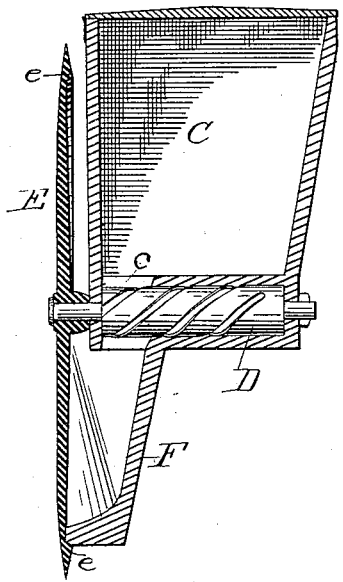
Figure 4:
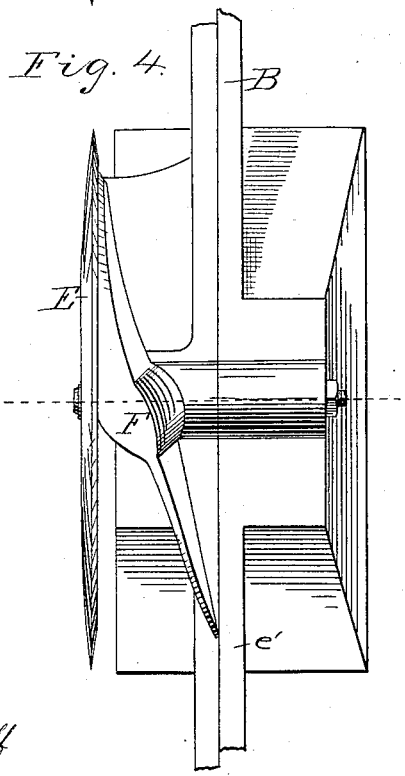

In the drawings, Figure 1 is a side elevation of my invention. Fig. 2 is a plan view thereof. Fig. 3 is a vertical transverse section through one of the hoppers. Fig. 4 is a plan view thereof, taken from beneath the same, and Fig. 5 is a detail view.

Reference being had to the drawings, A represents a rectangular frame, the forward transverse bar A' of which is provided with a number of clevises, $a$ $a$, corresponding to the number of drills or planters it is desired to place in the frame, and adjustable laterally thereon, as shown. These clevises are provided with lugs, to which are pivoted short beams (preferably) rigidly secured to the front part of the hoppers C of the drills or planters. These drills are provided with a suitable-shaped hopper, C, having the usual aperture, $c$, in its bottom for the passage of the seed, and having suitable bearing immediately below aperture $c$ for the enlarged axle D of the rotary colter E. This enlarged axle D has in that part of it, moving within the bearings and nearest the colter E, several pockets, which are filled with seed from the hopper through aperture $c$, and which, as the axle revolves, empties the seed through a suitable opening in the bearing diametrically opposite aperture $c$ into the furrow made by the rotary colter E and shield F.

The rotary colter E has a sharp cutting-edge, and is provided with a circumferential bead, $e$, on its inner side, which tapers from the sharp periphery of said colter to a point nearer the center thereof, where it terminates abruptly, forming a shoulder behind which the forward edge of the shield F hides. This shield F depends from the under surface of the hopper C. Its front edge describes a segment of a circle struck from the center of said colter, and hides behind or is protected by the shoulder formed by bead $e$, commencing at the lowest point thereof and pursuing its curved course upward to a point contiguous to said bead, intersected by a horizontal line drawn through the center of the colter, and from the point where the forward edge of said shield is protected by the bead it pursues an oblique course to the rear and away from the colter. It is in the space between the colter and the shield that the seed falls. As the machine advances, the rotary colter, by a chopping action, cuts the earth, and the incision thus made widens as the machine advances into a full-width furrow.

The great advantage to be derived from the use of a rotary colter and shield, as shown, is that less friction is generated than in either the old drill or planter.

Aligned with the front beam, B, and extending longitudinally to the rear from the hopper, is a short beam, $e'$, and extending from this beam is an arm, $d$, which has its rear end turned upward, and provided with a longitudinal slot, $d'$.

Pivoted to the side of arm $d$, near the hopper, is a lever, G, having its lower end provided with a segmental portion, $g$, which is provided with a corresponding segmental slot in which the stud on which wheel $h$ is journaled is adjustable. The upper end of lever G has one end of a cord or chain secured to it, and is made wider, so that its oscillations may be kept within certain limits. The cord H passes through the slot $d'$ in the end of arm $d$ over a pulley therein; down under the rear end frame, $A^2$, of the rectangular frame; around a pulley, $i$, journaled in and between lugs secured to and depending from frame $A^2$, and then vertically upward outside of frame $A^2$ to the drum I, around which it is wound. This drum I is fast on the transverse shaft J, journaled in the brackets $k$, secured to and extending vertically from the ends of said frame $A^2$.

Extending from a suitable boss fast on shaft J is a lever, K, which has pivoted, near the handle thereof, a thumb-lever, by operating which a spring-actuated dog or bolt, L, is withdrawn from or dropped into the notches of a vertical segmental rack, $m$, which is secured immediately below lever K to frame $A^2$.

The normal position of lever G is such that its upper end is inclined toward the hoppers of the planters or drills, and the wheel $h$, journaled in the lower end thereof, is usually adjusted in such position in the segmental slot in the segmental portion $g$ that it rests on the ground in or to the side of the furrow. Therefore, as the cord H is wound around the drum I by means of lever K it draws the upper end of lever G toward the rear of the machine, thus assuming a more perpendicular position, and lifting the hopper, (through the medium of arm $d$ and beam $e$,) so that as the machine moves forward the colter and shield would make a shallower furrow, as desired. When the cord H is unwound from the drum I, the weight of the machine will cause lever G to oscillate to its normal position, and the colter and shield to make a proportionately deeper furrow.

In order to prevent any lateral movement of the rear end of arm $d$, I make a vertical rectangular frame, $m'$, and provide it with a vertical longitudinal slot of the same width as said arm $d$, and in which the end of said arm moves.

One peculiarity of the clevises $a\ a$ and the frames $m\ m$ is that they may be attached to plates, and these plates be held against the inner vertical surfaces of the end frames, $A'$ and $A^2$, by clamps $n\ n$. These clamps are ⊏-shaped frames, having fingers on the extremities of the horizontal arms pointing toward each other, and having a set-screw, passing through the part connecting the two arms, which impinges against the outer surface of the end frames. By means of these clamps the clevises and frames $m$ can be adjusted laterally to suit the pleasure of the operator.

If desired, the circumferential bead on the inner surface of the colter may be dispensed with and the shield bear flush against it. Moreover, this colter and shield may be adopted either for a grain-drill or corn-planter without departure from the spirit of this invention.

What I claim as new, and desire to secure by Letters Patent, is—

1. The combination, with a rectangular frame, a grain-drill or corn-planter adjustable therein, and lever G, of arm $d$, cord H, and drum I.

2. The combination, with the hopper of a grain-drill or seed-planter, of a rotary colter journaled in bearings under said hopper, and a shield bearing, as shown, against said colter in such manner that the seed discharged from the hopper as it falls between them will drop into the furrow made thereby.

3. The combination, with a grain-drill or seed-planter, of a rotary colter, having a circumferential bead on its inner surface near the periphery, and a shield, as described, having its forward edge protected by said bead for about a quadrant of a circle, as hereinbefore fully set forth.

4. In a grain-drill, the combination, with a hopper having an opening in its bottom, and bearings below said bottom for the axle of the rotary colter, of said axle, having pockets in its periphery in alignment with the opening in the bottom of said hopper, said rotary colter, and a shield, the forward edge of which bears against the side of said colter.

In testimony that I claim the foregoing as my own I hereunto affix my signature in presence of two witnesses.

HENRY C. BEEBE.

Witnesses:
HARRY M. WAGGONER,
FRANK D. THOMASON.